H. GUELS.

Assignor by mesne assignments to THE WESTINGHOUSE AIR BRAKE COMPANY.

AUTOMATIC VALVE FOR AIR BRAKES.

No. 11,071. Reissued Apr. 15, 1890.

WITNESSES:

J. Howden Bell.

F. E. Gaither

INVENTOR,

Herman Guels, by George H. Christy Att'y.

for him and his Assignees

THE NORRIS PETERS CO., PHOTO-LITHO., WASHINGTON, D. C.

UNITED STATES PATENT OFFICE.

HERMAN GUELS, OF ST. LOUIS, MISSOURI, ASSIGNOR, BY MESNE ASSIGNMENT, TO THE WESTINGHOUSE AIR BRAKE COMPANY, OF PITTSBURG, PENNSYLVANIA.

AUTOMATIC VALVE FOR AIR-BRAKES.

SPECIFICATION forming part of Reissued Letters Patent No. 11,071, dated April 15, 1890.

Original No. 384,686, dated June 19, 1888. Application for reissue filed March 14, 1890. Serial No. 343,942.

*To all whom it may concern:*

Be it known that I, HERMAN GUELS, a citizen of the United States, residing at St. Louis, in the State of Missouri, have invented certain new and useful Improvements in Automatic Valves for Air-Brakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

Figure 2:
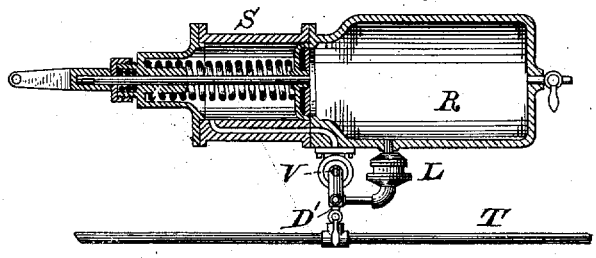
Figure 1:
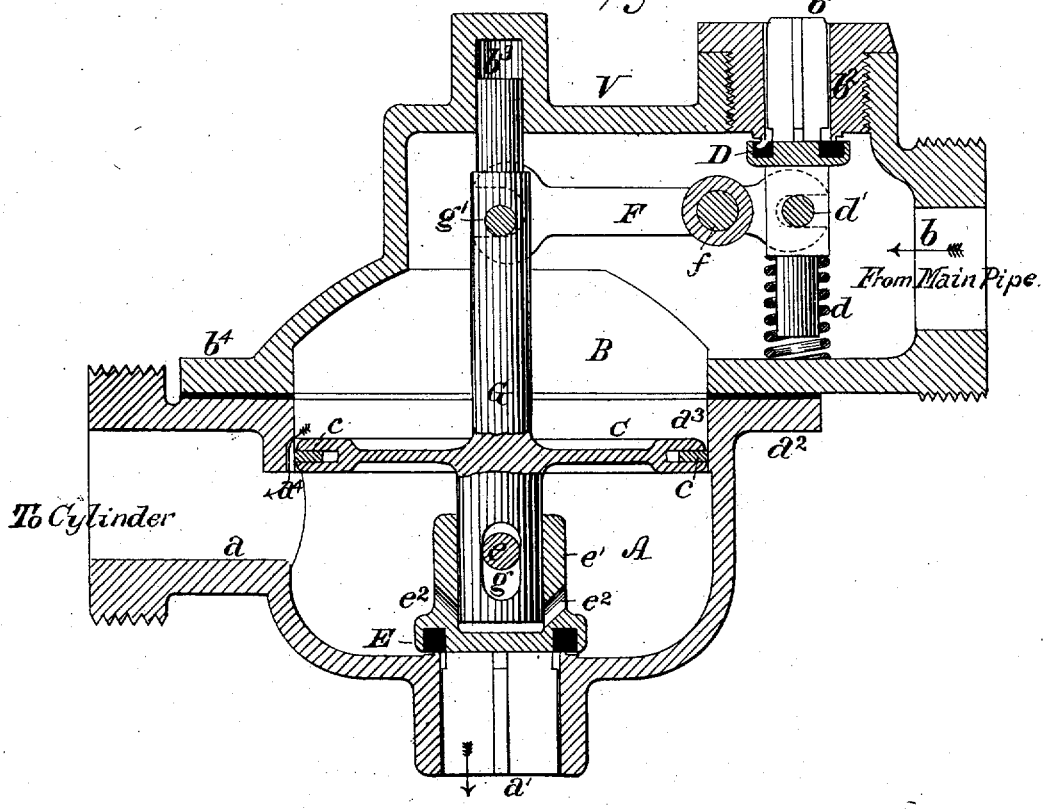

Figure 1 is a longitudinal vertical section of the valve-shell, with the valves partly in section and partly in elevation; and Fig. 2 is a plan view or diagram of the system, showing the arrangement of the valve and its relation to the train-pipe and reservoir.

Like letters and figures refer to like parts wherever they occur.

My present invention relates to the construction of valves for air-brake systems of that class generally termed the "equilibrio system," wherein the cylinder is in communication with the reservoir or expansion-chamber and the piston is *in equilibrio* when the brakes are off, and the brakes are applied by opening an exhaust and allowing the air to escape from one side of the piston, while the expansion of the air on the other side of the piston applies the brakes, and has for its objects, first, the production of a simple and sensitive exhaust-valve whereby the air may be quickly exploded or discharged from the main air-supply pipe or train-pipe of the system, so as to actuate the several successive valves of the system without a material or appreciable interval between the operation of the several valves; and, second, an equally quick or explosive discharge of the cylinder-air, so as to instantly apply the individual brakes.

One difficulty heretofore encountered in producing a quick-acting air-brake system of that class wherein the valves are automatically actuated by change of pressure in the train or main-supply pipe has arisen from the slowness with which the pressure fell in the system as a whole, the wave of reduction requiring an appreciable interval to extend from car to car or valve to valve. Another difficulty encountered has been due to slow exhaust of the air from the cylinder, with proportionate tardy application of the individual brakes. In order to overcome these difficulties, I provide two exhaust-valves—one for the train-pipe and one for the cylinder—and combine the same with a balanced valve in manner hereinafter more fully set forth, so that the combined mechanism is adapted to be actuated by change of pressure in the cylinder or main supply-pipe, and which opens both the main supply-pipe and the cylinder. The exhaust-ports for the main supply-pipe and for the cylinder should bear some relation to the capacity of said cylinder and main supply-pipe, in order to obtain the best results.

To simplify the construction, it is desirable to actuate the compound exhaust-valves from the supply-valve of the cylinder.

I will now proceed to describe my invention more specifically, in order that others skilled in the art to which it appertains may apply the same.

In the drawings, T indicates the main or train pipe; R, a reservoir or expansion-chamber, and S the cylinder of an air-brake system with which my valve may be used.

L indicates an equalizing valve-operating device for equalizing the pressure between the reservoir and train-pipe, a full description of which will be found in my application, Serial No. 253,638, of even date herewith; but as the same forms no part of the present invention I do not herein describe it.

V indicates the valve embodying my invention, and D′ the branch pipe leading from train-pipe T to the valve V, cylinder S, and reservoir R.

A indicates the lower section, and B the upper section, of the valve shell or casing, which casing I prefer to make in two sections, as specified, because the same can be easily cast and readily finished by common tools, as will hereinafter appear. The lower section A is provided with a port $a$, which leads to the cylinder, an exhaust-port $a'$, communicating with the atmosphere, and a flange $a^2$, or equivalent means, for securing it to the upper shell-section B. Its interior is bored or otherwise finished to form a cylinder-section $a^3$ for the reception of a piston-valve C, and is grooved to form a port, as at $a^4$, which is opened and closed by the movement of said piston C.

The upper section B of the shell is provided with a port $b$, which leads to the main air-supply or train pipe with an exhaust-port $b'$, provided with a bushing or seat-plug $b^2$, a guide-recess $b^3$ for the stem of the piston-valve, and a flange $b^4$, or equivalent means, for securing it to lower shell-section A. Arranged within said casing or shell-sections are, first, an exhaust-valve D for the main air-supply pipe; secondly, an exhaust-valve E for the cylinder, and thirdly, a supply-valve C for the cylinder, and the several valves are combined so that their movements are in a measure dependent one on the other. The exhaust-valves D and E are preferably winged valves, as shown, while the valve C is preferably a piston-valve having a ring-packing $c$. I generally use but a single ring for the packing $c$, as a slight leak is desirable rather than objectionable, as under some conditions—as, for instance, accidental slight leakage in the main supply-pipe—it will act to preserve or restore the equilibrium between the pressure in shell-section A and shell-section B.

G indicates the stem of piston-valve C, the upper end of which may enter guide-recess $b^3$ of shell B, while its lower end has an elongated slot $g$ for the reception of a pin $e$, by which it is loosely connected to the exhaust-valve E. This elongated slot is very important for two reasons—viz., first, it allows an independent upward movement of stem G sufficiently to unseat the exhaust-valve D before exhaust-valve E is lifted; and, second, it allows a sufficient downward movement of stem G to insure the seating of valve D before the motion of stem G is arrested.

The exhaust-valve E has socket $e'$ for the reception of the lower end of stem G, and said socket is provided with ports or openings $e^2$, to permit the free discharge of any dust, which might otherwise accumulate and impede the free movement between the valve E and stem G.

The exhaust-valve D may be lightly supported by a spring $d$, to insure its seating; but this is not essential, as the valve will usually be held up to its seat by the weight of the long arm of lever F, and the air-pressure in the main supply-pipe, except at such times as it is opened by the movement of valve-stem G.

Upon the stem of valve D is a pin $d'$, which engages in a fork on the short arm of a valve-lever F, which lever has its fulcrum on the shell, as at $f$. The opposite or long arm of valve-lever F has also a fork, which engages a pin $g'$ on the upper end of stem G; but the fork on the long arm of the lever F is sufficiently wider than the pin $g'$, which it engages, to permit the stem G and its piston-valve C to move up sufficiently to pass the port $a^4$ and close the connection between the upper and lower chambers of the shell before the pin $g'$ strikes and operates valve-lever F to open exhaust-valve D.

It will be noted that unless the port $a^4$ is closed before the exhaust D is opened there will be a loss of air-pressure in the cylinder, which acts on the piston C, the equilibrium between the upper and lower chambers of the valve will be partially restored, the pressure on piston-valve C, which operates the valves D E, will be reduced, and the exhaust-valves will not be as quickly and fully opened.

The devices when in position for use will be connected by the port $a$ with the brake-cylinder and by the port $b$ with the main air-supply pipe. Upon the slightest reduction of pressure in the main supply-pipe, provided said reduction is sudden, (and not slow and gradual, as in leakage,) the equilibrium of piston-valve C will be disturbed, and it will rise from the pressure in the brake-cylinder. In its upward movement it will first close the port $a^4$. Then the pin $g'$ on the stem G will strike and carry up the long arm of valve-lever F, depressing the short arm and partially opening exhaust-valve D. This partial opening of exhaust-valve D will instantly deplete the main supply-pipe, which largely reduces the pressure in the upper side of piston-valve C, whereupon the sudden expansion of the air in the brake-cylinder will drive up the valve C and suddenly open the exhaust-valve E, so as to exhaust the air from the brake-cylinder suddenly and forcibly. The instant the brake system is given air the pressure in the main supply-pipe will enter port $b$, seat exhaust-valve D, depress piston-valve C, open port $a^4$, enter the lower section A of the shell, seat exhaust-valve E, fill the brake-cylinder, and restore the equilibrium of pressure throughout the system.

Among the advantages of my invention are, first, the simplicity of the valve-shell and valves, which enables me to make tight and efficient valves without skilled labor or special tools; secondly, the few elements composing the operative combinations and their simple structure, which enables me to readily combine and adjust them so as to insure accuracy of action and great durability with non-liability to get out of order, and, thirdly, the several valves being combined by pins and levers the action of one upon the other must be positive and not liable to vary from lost motion, wear of parts, &c.

I do not herein broadly claim the combination, with a balanced valve, of an exhaust-valve for the cylinder and an exhaust-valve for the train-pipe, said exhaust-valves actuated from the balanced valve, as the same forms the subject-matter of a separate application, Serial No. 253,638, filed of even date herewith.

What I claim herein, and desire to secure by Letters Patent, is—

1. In a fluid-pressure automatic railwaybrake mechanism, the combination of a main valve-operating piston arranged to slide in the main valve-casing, a passage in the casing, whereby air may pass from one side of the piston to the other side, an exhaust-passage from the train-pipe to the outer atmosphere, and an exhaust-valve controlling said passage and so arranged as to be opened by the movement of the piston on a reduction of train-pipe pressure, substantially as set forth.

2. In an automatic valve for air-brakes, the combination of a piston-valve, a port which is opened and closed thereby, an exhaust-valve, and a lever for actuating the exhaust-valve from the stem of the piston-valve, the connection between the piston-stem and lever being loose to allow of an interval of motion for the valve-stem before it actuates the lever and exhaust-valve, whereby the port of the piston-valve is closed before the exhaust-valve is opened, substantially as and for the purposes specified.

3. In an automatic valve for air-brakes, the combination of a piston-valve, an exhaust-valve for the train-pipe loosely connected to the stem of the piston-valve to permit an interval of movement of the piston before it actuates the train-pipe exhaust-valve, and an exhaust-valve for the cylinder loosely connected to the stem of the piston-valve to permit an interval of movement in the piston-valve before it actuates the cylinder exhaust-valve, substantially as and for the purposes specified.

4. In an automatic valve for air-brakes, the combination, with a piston-valve, of a puppet exhaust-valve for the train-pipe and a puppet exhaust-valve for the cylinder, said exhaust-valves connected with and actuated from the stem of the piston-valve, and said valves relatively arranged within the valve-shell, so as to be held on their seats by the pressure in the train-pipe, substantially as and for the purposes specified.

5. In an automatic valve for air-brakes, the combination of a shell composed of two sections A B, each having an exhaust-port, two exhaust-valves to control said ports, and an intermediate balanced valve for controlling the exhaust-valves, substantially as and for the purposes specified.

In testimony whereof I have affixed my signature in presence of two witnesses.

HERMAN GUELS.

Witnesses:
R. H. WHITTLESEY,
GEORGE H. CHRISTY.